United States Patent
Hu et al.

(10) Patent No.: US 6,879,875 B1
(45) Date of Patent: Apr. 12, 2005

(54) LOW COST MULTISENSOR HIGH PRECISION POSITIONING AND DATA INTEGRATED METHOD AND SYSTEM THEREOF

(75) Inventors: Guohui Hu, Simi Valley, CA (US); Ching-Fang Lin, Simi Valley, CA (US)

(73) Assignee: American GNC Corporation, Simi Valley, CA (US)

( * ) Notice: Subject to any disclaimer, the term of this patent is extended or adjusted under 35 U.S.C. 154(b) by 0 days.

(21) Appl. No.: 10/946,598

(22) Filed: Sep. 20, 2004

Related U.S. Application Data (60) Provisional application No. 60/503,975, filed on Sep. 20, 2003.

(51) Int. Cl.[7] .................... G01C 21/26; G01C 21/28; G01C 21/34; G01C 21/36
(52) U.S. Cl. ............... 700/213; 701/200; 701/208; 701/210; 701/213; 701/214; 701/215; 701/216; 701/217; 701/220; 701/221; 340/438; 340/488; 340/990; 340/994; 342/353; 342/357.06; 342/357.08; 342/357.13; 342/357.14; 342/386; 700/245; 318/568.1; 714/819
(58) Field of Search ................ 342/357.07, 357.08, 342/357.13, 357.14, 386, 353, 357.06; 244/3.1, 3.2; 375/259, 377; 600/595; 714/819; 213/36; 700/245; 318/568.1; 701/1, 36, 200, 208, 210, 213–217, 220–221, 301; 340/438, 488, 990, 994

(56) References Cited

U.S. PATENT DOCUMENTS

| | | | | |
|---|---|---|---|---|
| 6,317,688 B1 | * | 11/2001 | Bruckner et al. | 701/213 |
| 6,424,914 B1 | * | 7/2002 | Lin | 701/214 |
| 6,522,266 B1 | * | 2/2003 | Soehren et al. | 340/988 |
| 6,522,992 B1 | * | 2/2003 | McCall et al. | 702/141 |
| 6,526,352 B1 | * | 2/2003 | Breed et al. | 701/213 |
| 6,658,354 B2 | * | 12/2003 | Lin | 701/214 |
| 6,671,622 B2 | * | 12/2003 | McCall et al. | 701/220 |
| 6,704,619 B1 | * | 3/2004 | Coleman et al. | 700/245 |
| 6,720,920 B2 | * | 4/2004 | Breed et al. | 342/386 |
| 6,735,523 B1 | * | 5/2004 | Lin et al. | 701/216 |
| 6,768,944 B2 | * | 7/2004 | Breed et al. | 701/301 |
| 2002/0198632 A1 | * | 12/2002 | Breed et al. | 701/1 |
| 2003/0191568 A1 | * | 10/2003 | Breed | 701/36 |

OTHER PUBLICATIONS

Cao et al., Low cost SINS/GPS integration for land vehicle navigation, 2002, IEEE, pp. 910–913.*

Willms, Space integrated GPS/INS (SIGI) navigation system for Space Shuttle, 1999, IEEE, pp. 7.A.4–1 –7.A.4–8 vol. 2.*

Dissanayake et al., The aiding of low–cost strapdown inertial measurement unit using vehicle model constraints for land vehicle applications, 2001, IEEE, pp, 731–747.*

* cited by examiner

Primary Examiner—Thomas G. Black
Assistant Examiner—McDieunel Marc
(74) Attorney, Agent, or Firm—Raymond Y. Chan; David and Raymond (57) ABSTRACT

The design of the low cost GPS/IMU positioning and data integrating method, which employs integrated global positioning system/inertial measurement unit enhanced with dual antenna GPS carrier phase measurements to initialize and stabilize the azimuth of the low cost GPS/IMU integrated system, is performed. The utilization of the raw carrier phase measurement for the integration speeds up the ambiguity search.

1 Claim, 5 Drawing Sheets

LOW COST MULTISENSOR HIGH PRECISION POSITIONING AND DATA INTEGRATED METHOD AND SYSTEM THEREOF

CROSS REFERENCE OF RELATED APPLICATION

This is the regular application of a provisional application having an application No. 60/503,975 and a filing date of Sep. 20, 2003.

The present invention was made with Government support under Contract No. NAS13-02051 awarded by the U.S. NASA/John C. Stennis Space Center, Stennis Space Center, MS 39529-6000. The Government has certain rights in the present invention.

BACKGROUND OF THE PRESENT INVENTION

TECHNICAL FIELD

1. Field of Invention

The present invention relates generally to the design of dual antenna GPS/INS integrated systems, and more particularly to the low cost GPS/IMU positioning and data integrating method, which employs integrated global positioning system/inertial measurement unit enhanced with dual antenna GPS carrier phase measurements to initialize and stabilize the azimuth of the low cost GPS/IMU integrated system. The utilization of the raw carrier phase measurements for the integration speeds up the ambiguity search.

2. Description of Related Arts

Due to the high cost of high accuracy INS (inertial navigation system) and the errors accumulation, the applications of INS are restricted. GPS can provide position, velocity, pseudorange, carrier phase and ephemeris without errors accumulation. It has been found that GPS/INS integration is superior to each one working alone.

Advancement in the technology of the low cost solid-state inertial sensors has reduced the price of a full inertial sensor assembly. So far, the single frequency GPS OEM board is very cheap.

Inertial navigation systems, in principle, permit pure autonomous operation and output continuous position, velocity, and attitude data of vehicle after initializing the starting position and initiating an alignment procedure. In addition to autonomous operation, other advantages of inertial navigation systems include the full navigation solution and wide bandwidth. However, an inertial navigation system is expensive and subject to drift over an extended period of time. This means that the position error increases with time. This error propagation characteristic is primarily caused by its inertial sensor error sources, such as gyro drift, accelerometer bias, and scale factor errors.

SUMMARY OF THE PRESENT INVENTION

It is a main objective of the present invention to provide a dual antenna GPS/IMU integrated method and system thereof, in which a low cost IMU and GPS integrated system can provide high accuracy attitude, azimuth, position and velocity, wherein a micro IMU (such as the U.S. Pat. No. 6,456,939 entitled "Micro Inertial Measurement Unit" and U.S. Pat. No. 6,522,992 entitled "Core Inertial Measurement Unit") is incorporated. The navigation fusion method involved U.S. Pat. No. 6,278,945 entitled "Fully-Coupled Positioning Process and System Thereof", U.S. Pat. No. 6,292,750 entitled "Vehicle Positioning Method and System Thereof", U.S. Pat. No. 6,311,129 entitled "Positioning Process and System Thereof", U.S. Pat. No. 6,408,245 entitled "Filtering Mechanization Method of Integrating Global Positioning System with Inertial Measurement Unit", U.S. Pat. No. 6,415,223 entitled "Interruption-Free Hand-Held Positioning Method and System Thereof", U.S. Pat. No. 6,424,914 entitled "Fully-Coupled Vehicle Positioning Method and System Thereof", U.S. Pat. No. 6,427,122 entitled "Positioning and Data Integrating Method and System Thereof", U.S. Pat. No. 6,449,559 entitled "Fully-Coupled Positioning Process and System Thereof", U.S. Pat. No. 6,480,152 entitled "Integrated GPS/IMU Method and Microsystem Thereof", U.S. Pat. No. 6,510,354 entitled "Universal Robust Filtering Process", U.S. Pat. No. 6,738,714 entitled "Vehicles Self-Carried Positioning Method and System Thereof", U.S. Pat. No. 6,658,354 entitled "Interruption Free Navigator", U.S. Pat. No. 6,240,367 entitled "Full Fusion Positioning Method for Vehicle" and U.S. Pat. No. 6,246,960 entitled "Vehicle Fully-Coupled GPS/IMU with Radar Altimeter". The above list patents are by Ching-Fang Lin.

Another objective of the present invention is to provide a dual antenna GPS/IMU integrated method and system thereof, in which dual antenna GPS can provide high accuracy elevation, azimuth, position and velocity.

The present invention can substantially solve the cost problems encountered in avionics system integration by using state-of-the-art inertial sensor, integrated dual antenna global positioning system. The present invention is to balance multiple requirements imposed on the modern avionics systems design and manufacturing: low cost, high accuracy, reliability, small size and weight, low power consumption, ease of operation and maintenance, and ease of modification.

These and other objectives, features, and advantages of the present invention will become apparent from the following detailed description, the accompanying drawings, and the appended claims.

DETAILED DESCRIPTION OF THE PREFERRED EMBODIMENT

Generally, the accuracy of inertial navigation systems (INS) can be improved by employing highly accurate inertial sensors or by compensating with data from an external sensor. The cost of developing and manufacturing inertial sensors increases as the level of accuracy improves. The advances in new inertial sensor technology and electronic technologies have led to the availability of low cost inertial sensors, such as mechanical-electronic-micro-system (MEMS) inertial sensors. Mechanical-electronic-microsystem inertial sensors borrow processes from the semiconductor industry to fabricate tiny sensors and actuators on silicon chips. The precision of these new inertial sensors may be less than what conventional sensors achieve, but they have enormous cost, size, weight, thermal stability and wide dynamic range advantages over conventional inertial sensors.

The present invention employs an integrated global positioning system (GPS)/inertial measurement unit using three GPS carrier phase measurements to provide highly accurate and continuous positioning of a vehicle, highly accurate attitude determination, and platform body acceleration and rotation data, as well as time data output. These data are managed and dispensed by a control board. The advantages of the present invention include:

(1) The inertial navigation system has high accuracy short term positioning capability, but is subject to long term drift leading to a poor long term navigation solution. The global positioning system (GPS) differential carrier phase positioning has long term highly accurate navigation performance, which can reach centimeter accuracy. Through integration of these two disparate systems, it is expected to obtain a high accuracy long term and short term navigation solution. In the positioning, the inertial navigation system aids the GPS to search for integer ambiguities very fast, while differential carrier phase GPS compensates the inertial navigation system drift to reach centimeter positioning accuracy.

(2) The gyros of the low cost inertial navigation system can not sense earth rotation for the initial alignment. It can not provide the azimuth by itself. The dual antenna GPS carrier phase measurements aid the inertial navigation system for the initial alignment. The inertial navigation system measurements increase the dual antenna GPS carrier phase measurement ambiguity search.

(3) The GPS signal is easy to block, which causes cycle slips of the GPS carrier phase measurement. The short term high accuracy of the inertial navigation system aids the GPS carrier phase measurements to detect the cycle slips.

Figure 1:
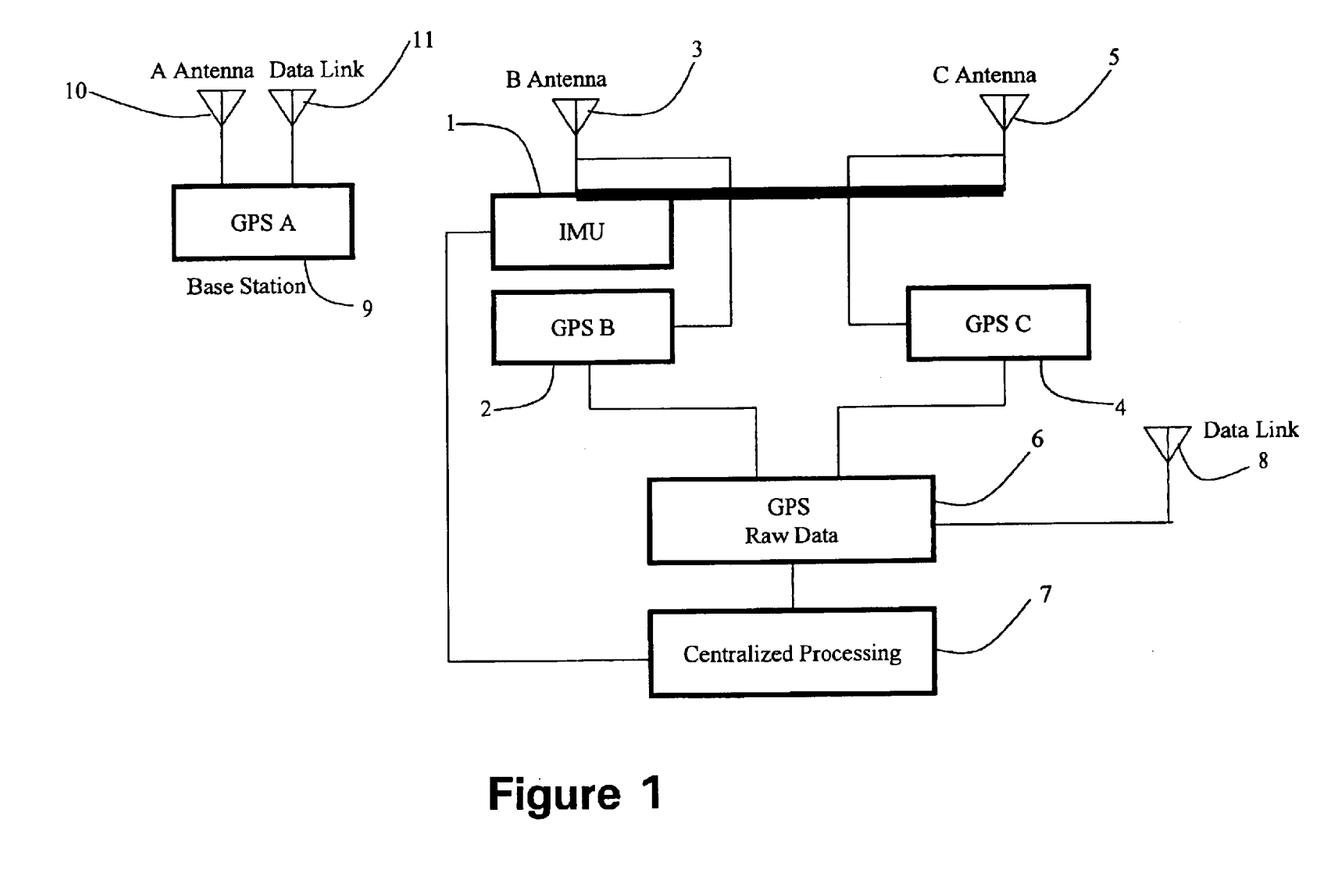
FIG. 1 is a block diagram illustrating a dual antenna GPS/IMU integrated method and system, an inertial measurement unit (IMU), two GPS rovers (B GPS and C GPS), two GPS rover antennas (B antenna and C antenna), a rover data link, a GPS raw data collector, Centralized Processing module, a GPS base station (GPS A), a GPS base station antenna and a GPS base station data link, according to the present invention.

Referring to FIG. 1, a dual antenna GPS/IMU integrated method and system is composed of an inertial measurement unit (IMU) 1, two GPS rovers (B GPS 2 and C GPS 4), two GPS rover antennas (B antenna 3 and C antenna 5), a rover data link 8, a GPS raw data collector 6, Centralized Processing module 7, a GPS base station (GPS A 9), a GPS base station antenna 10 and a GPS base station data link 11.

Figure 2:
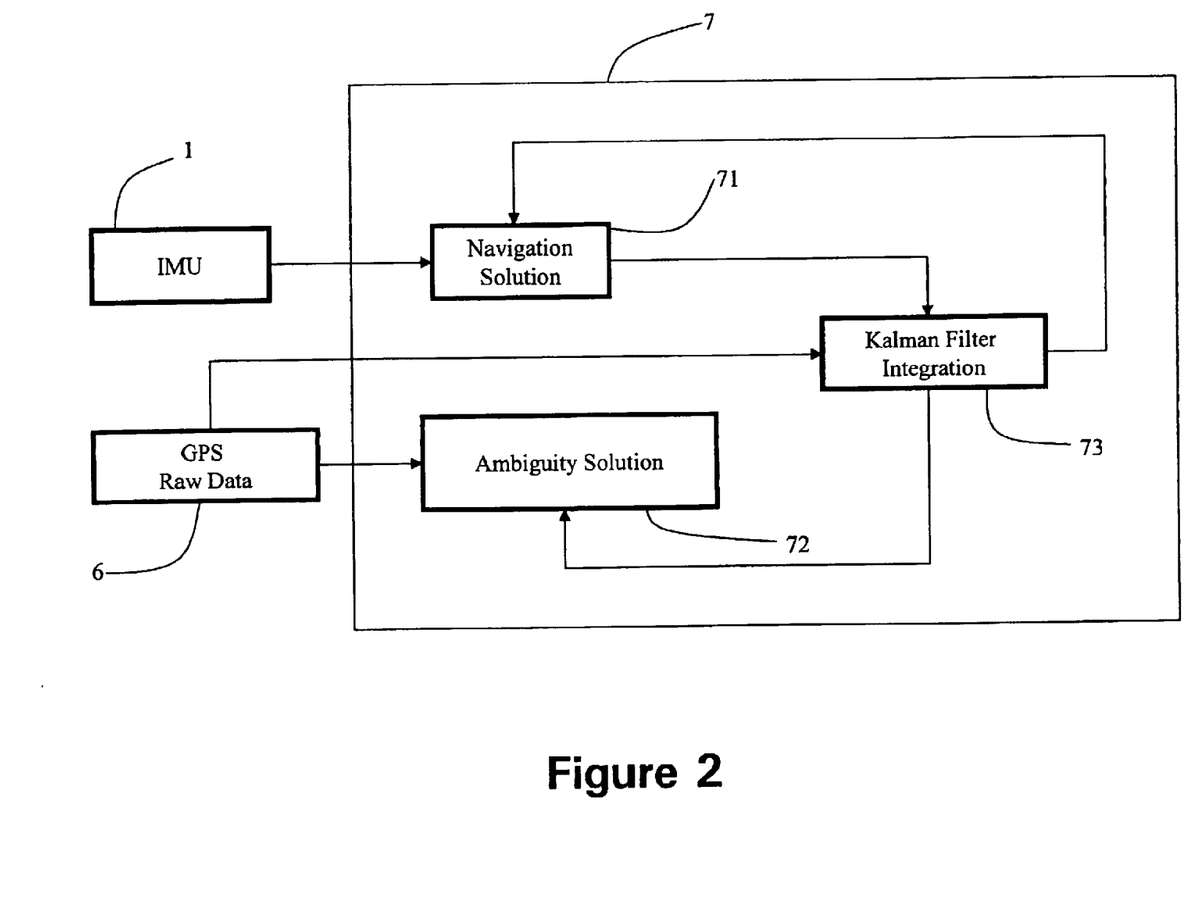
FIG. 2 is a block diagram of a centralized processing module in the ambiguity search stage according to the present invention.

Referring to FIG. 2, a Centralized Processing module 7 is composed of Navigation Solution module 71, Kalman Filter Integration module 73, and Ambiguity Solution module 72.

In the Kalman Filter Integration module 73, state equation and measurement equation are required. The state dynamic models and measurement models are in the following.

Tilt angle error model $$\dot{\phi}_N = \frac{\delta V_E}{R_n + h} - \omega_{ie}\sin L \delta L - \left(\omega_{ie}\sin L + \frac{V_E}{R_n + h}\tan L\right)\phi_E + \frac{V_N}{R_m + h}\phi_D - \varepsilon_N$$

$$\dot{\phi}_E = \frac{\delta V_N}{R_m + h} + \left(\omega_{ie}\sin L + \frac{V_E}{R_n + h}\tan L\right)\phi_N + \left(\omega_{ie}\cos L + \frac{V_E}{R_n + h}\right)\phi_D - \varepsilon_E$$

$$\dot{\phi}_D = -\frac{\delta V_E}{R_n + h}\tan L + \left(\omega_{ie}\cos L + \frac{V_E}{R_n + h}\sec^2 L\right)\delta L - \left(\omega_{ie}\cos L + \frac{V_E}{R_n + h}\right)\phi_E - \frac{V_N}{R_m + h}\phi_N - \varepsilon_D$$

Velocity Error Model $$\delta \dot{V}_N = -f_D\phi_E + f_E\phi_D - 2\left(\omega_{ie}\sin L + \frac{V_E}{R_n + h}\tan L\right)\delta V_E + \frac{V_D}{R_m + h}\delta V_N - \left(2\omega_{ie}\cos L + \frac{V_E}{R_n + h}\sec^2 L\right)V_E\delta L + \frac{V_N}{R_m + h}\delta V_D + \nabla_N$$

$$\delta \dot{V}_E = f_N\phi_D + f_D\phi_N + \left(\frac{V_N}{R_m + h}\tan L + \frac{V_D}{R_m + h}\right)\delta V_E + \left(2\omega_{ie}\sin L + \frac{V_E}{R_n + h}\tan L\right)\delta V_N + \left(2\omega_{ie}\cos L V_N + \frac{V_E V_N}{R_n + h}\sec^2 L - 2\omega_{ie}\sin L V_D\right)\delta L + \nabla_E$$

$$\delta \dot{V}_D = -f_E\phi_N + f_N\phi_E - 2\left(\omega_{ie}\cos L + \frac{V_E}{R_n + h}\right)\delta V_E - 2\frac{V_N}{R_m + h}\delta V_N + 2\omega_{ie}\sin L V_E\delta L + \nabla_D$$

Position Error Model $$\delta \dot{L} = \frac{\delta V_N}{R_m + h}$$

$$\delta \dot{\lambda} = \frac{\delta V_E}{R_n + h}\sec L + \frac{V_E}{R_n + h}\sec L \tan L \delta L$$

$$\delta \dot{h} = -\delta V_D$$

where $R_m = R_e(1 - 2e + 3e \sin^2 L)$; $R_n = R_e(1 + e \sin^2 L)$; $R_e = 637817$; $e = 1/298.257$; where $\phi_N$, $\phi_E$ and $\phi_D$ are north, east and down tilt angles respectively; $f_N$, $f_E$ and $f_D$ are north, east and down specific forces respectively; $V_N$, $V_E$ and $V_D$ are north, east and down velocities respectively; $\delta V_N$, $\delta V_E$ and $\delta V_D$ are north, east and down velocity errors respectively; $\omega_{ie}$ is earth rate; L, $\lambda$ and h are latitude, longitude and altitude respectively; $\delta L$, $\delta \lambda$ and $\delta h$ are latitude, longitude and altitude errors respectively; $\varepsilon_N$, $\varepsilon_E$ and $\varepsilon_D$ are north, east and down gyro drifts in the navigation frame, respectively; and $\nabla_N$, $\nabla_E$ and $\nabla_D$ are north, east and down accelerometer errors in the navigation frame, respectively.

Gyroscope Drift Error Model

Suppose the gyro drift model of the three axes is the same.

$$\dot{\varepsilon}_b = -\frac{1}{T_r}\varepsilon_b + w_g;$$

where $T_r$ is time constant; $\varepsilon_b$ is a first order Markov process; and $w_g$ is white noise.

Accelerometer Error Model

Suppose the accelerometer error model of the three axes is the same.

$$\dot{\nabla}_b = -\frac{1}{T_a}\nabla_b + w_a;$$

where $T_a$ is time constant; $\nabla_b$ is a first order Markov process; and $w_a$ is white noise.

Measurement Model

Measurement equation is formulated with carrier-phase of receiver A, receiver B, and receiver C, pseudorange-rate of receiver A and receiver B. Double difference technique is involved in the measurement.

State and measurement equations are derived from the above state dynamic model and measurement model.

$$\dot{X} = FX + Gw$$

$$Y = HX + Mv$$

Where, $$X^T = [\phi_N \quad \phi_E \quad \phi_D \quad \delta V_N \quad \delta V_E \quad \delta V_D \quad \delta L \quad \delta \lambda \quad \delta h \quad \varepsilon_{bx} \quad \varepsilon_{by} \quad \varepsilon_{bz}$$
$$\nabla_x \quad \nabla_y \quad \nabla_z \quad N_{21}^{AB} \quad N_{31}^{AB} \quad \ldots \quad N_{ml}^{AB} \quad N_{21}^{CB} \quad N_{31}^{CB} \quad \ldots \quad N_{ml}^{CB}]$$

$$Y^T = [\Delta\rho_{21}^{AB} \quad \Delta\rho_{31}^{AB} \quad \ldots \quad \Delta\rho_{ml}^{AB} \quad \Delta\dot{\rho}_{21}^{AB} \quad \Delta\dot{\rho}_{31}^{AB} \quad \ldots \quad \Delta\dot{\rho}_{ml}^{AB} \quad \Delta\rho_{21}^{CB} \quad \Delta\rho_{31}^{CB} \quad \ldots \quad \Delta\rho_{ml}^{CB}]$$

where m is the number of visible satellites; $\Delta\rho_{i1}{}^{AB}$, $\Delta\rho_{i1}{}^{CB}$ are the double difference carrier phase measurements (satellite i to satellite 1, antenna A to B, antenna C to B); $\Delta\dot{\rho}_{i1}{}^{AB}$ is the double difference carrier phase-velocity measurement; $N_{i1}{}^{AB}$, $N_{i1}{}^{CB}$ are the ambiguities of the double difference carrier phase measurements; $\epsilon_{bx}$, $\epsilon_{by}$ and $\epsilon_{bz}$ are three axes gyro drifts in the body frame, respectively; and $\nabla_x$, $\nabla_y$ and $\nabla_z$ are three axes accelerometer errors in the navigation frame, respectively.

$$F = \begin{bmatrix} F_{11} & F_{12} & 0 & 0 \\ 0 & F_{22} & 0 & 0 \\ 0 & 0 & 0 & 0 \\ 0 & 0 & 0 & 0 \end{bmatrix} \quad F_{12} = \begin{bmatrix} C_b^n & 0_{3\times 3} \\ 0_{3\times 3} & C_b^n \end{bmatrix}$$

$F_{11}$ is coefficient matrix of inertial error state equation.

$$F_{22} = Diag\left[-\frac{1}{T_{rx}} \quad -\frac{1}{T_{ry}} \quad -\frac{1}{T_{rz}} \quad -\frac{1}{T_{ax}} \quad -\frac{1}{T_{ay}} \quad -\frac{1}{T_{az}}\right]$$

$$H = \begin{bmatrix} 0_{(m-1)\times 3} & 0_{(m-1)\times 3} & H_1 H_2 & 0_{(m-1)\times 3} & 0_{(m-1)\times 3} & \lambda I_{(m-1)\times(m-1)} & 0_{(m-1)\times(m-1)} \\ 0_{(m-1)\times 3} & H_1 C_n^s & 0_{(m-1)\times 3} & 0_{(m-1)\times 3} & 0_{(m-1)\times 3} & 0_{(m-1)\times(m-1)} & 0_{(m-1)\times(m-1)} \\ H_4 C_n^e C_b^n H_3 & 0_{(m-1)\times 3} & 0_{(m-1)\times 3} & 0_{(m-1)\times 3} & 0_{(m-1)\times 3} & 0_{(m-1)\times(m-1)} & \lambda I_{(m-1)\times(m-1)} \end{bmatrix}$$

$$H_1 = \begin{bmatrix} e_{21}^{AB} - e_{11}^{AB} & e_{22}^{AB} - e_{12}^{AB} & e_{23}^{AB} - e_{13}^{AB} \\ e_{31}^{AB} - e_{11}^{AB} & e_{32}^{AB} - e_{12}^{AB} & e_{33}^{AB} - e_{13}^{AB} \\ \vdots & \vdots & \vdots \\ e_{m1}^{AB} - e_{11}^{AB} & e_{m2}^{AB} - e_{12}^{AB} & e_{m3}^{AB} - e_{13}^{AB} \end{bmatrix}$$

where $e_{i1}{}^{AB}$, $e_{i2}{}^{AB}$, $e_{i3}{}^{AB}$ are three elements of the direction cosine of the vector from satellite I to antenna A or B in the earth center earth frame (ECEF).

$$H_2 = \begin{bmatrix} -(R_n + h)\sin L \cos \lambda & -(R_n + h)\cos L \sin \lambda & \cos L \cos \lambda \\ -(R_n + h)\sin L \cos \lambda & (R_n + h)\cos L \sin \lambda & \cos L \sin \lambda \\ (R_n(1-e^2) + h)\cos L & 0 & \cos L \end{bmatrix}$$

$$H_3 = \begin{bmatrix} 0 & -r_{CBx}^b & r_{CBy}^b \\ -r_{CBy}^b & r_{CBx}^b & 0 \\ r_{CBx}^b & 0 & -r_{CBx}^b \end{bmatrix}$$

$$H_4 = \begin{bmatrix} e_{21}^{CB} - e_{11}^{CB} & e_{22}^{CB} - e_{12}^{CB} & e_{23}^{CB} - e_{13}^{CB} \\ e_{31}^{CB} - e_{11}^{CB} & e_{32}^{CB} - e_{12}^{CB} & e_{33}^{CB} - e_{13}^{CB} \\ \vdots & \vdots & \vdots \\ e_{ml}^{CB} - e_{11}^{CB} & e_{m2}^{CB} - e_{12}^{CB} & e_{m3}^{CB} - e_{13}^{CB} \end{bmatrix}$$

where $[r_{CBx}{}^b \; r_{CBy}{}^b \; r_{CBz}{}^b]$ is baseline vector (antenna C to B) in body frame.

$$M = \begin{bmatrix} M_1 & 0 & 0 \\ 0 & M_1 & 0 \\ 0 & 0 & M_1 \end{bmatrix}$$

$$M_1 = \begin{bmatrix} -1 & 1 & 0 & \ldots & 0 \\ -1 & 0 & 1 & \ldots & 0 \\ \vdots & \vdots & \vdots & \ddots & \vdots \\ -1 & 0 & 0 & \ldots & 1 \end{bmatrix}$$

$$w = [w_{gx} \quad w_{gy} \quad w_{gz} \quad w_{ax} \quad w_{ay} \quad w_{az}]$$

$$G = \begin{bmatrix} C_b^n & 0_{3\times 3} \\ 0_{6\times 3} & 0_{6\times 3} \\ 0_{3\times 3} & 0_{3\times 3} \\ 0_{3\times 3} & I_{3\times 3} \\ 0_{2(m-1)\times 3} & 0_{2(m-1)\times 3} \end{bmatrix}$$

Figure 3:
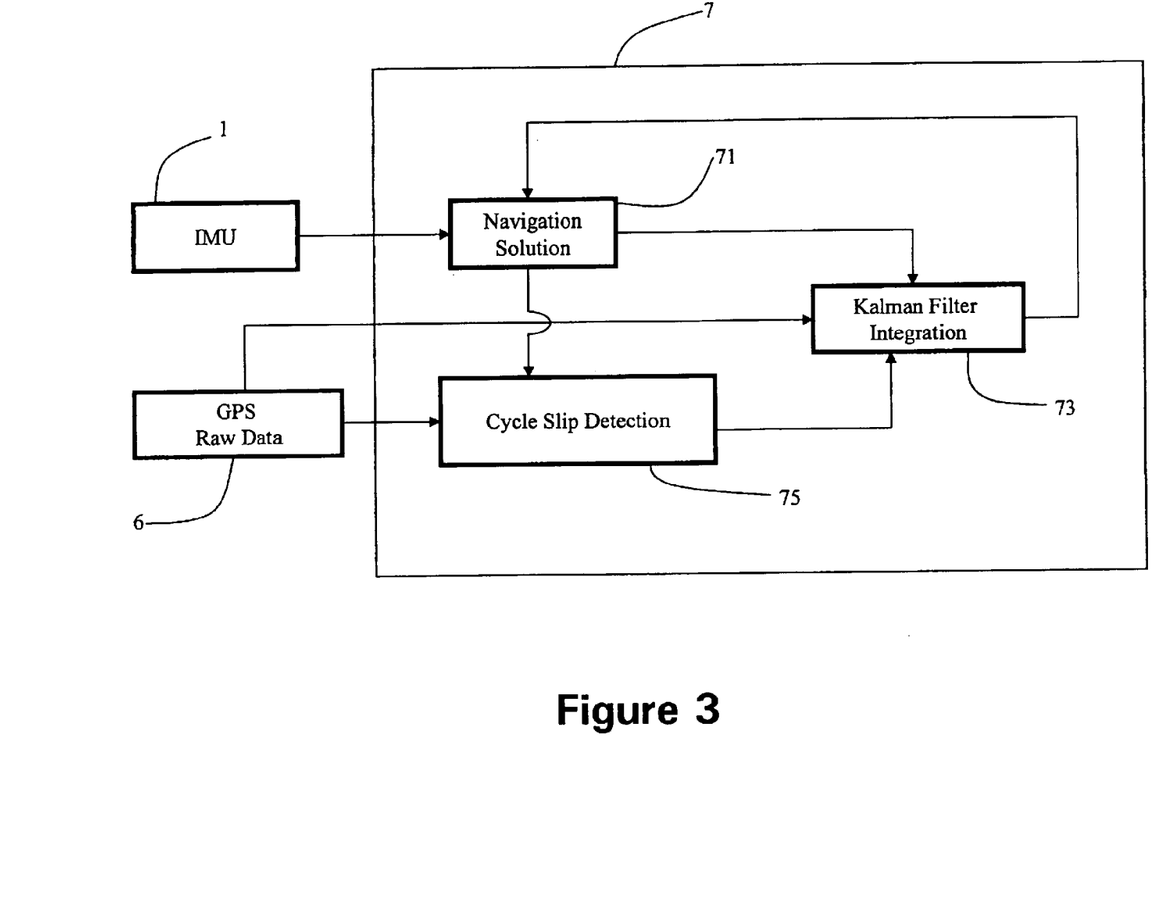
FIG. 3 is a block diagram of a centralized processing module in the ambiguity fix stage according to the present invention.

Referring to FIG. 3, a Centralized Processing module 7 is composed of Navigation Solution module 71, Kalman Filter Integration module 73, and Cycle Slip Detection module 75.

If the ambiguities are fixed all of the estimated ambiguities are known, and are removed from the states. The state equations and measurement equations are in the following:

$$\dot{X} = FX + Gw$$

$$\dot{Y} = HX + Mv$$

Where, $$X^T = [\phi_N \ \phi_E \ \phi_D \ \delta V_N \ \delta V_E \ \delta V_D \ \delta L \ \delta\lambda \ \delta h \ \varepsilon_{bx} \ \varepsilon_{by} \ \varepsilon_{bz} \ \nabla_x \ \nabla_y \ \nabla_z]$$

$$Y^T = \lfloor \Delta\rho_{21}^{AB} \ \Delta\rho_{31}^{AB} \ \ldots \ \Delta\rho_{ml}^{AB} \ \Delta\dot{\rho}_{21}^{AB} \ \Delta\dot{\rho}_{31}^{AB} \ \ldots \ \Delta\dot{\rho}_{ml}^{AB} \ \Delta\rho_{21}^{CB} \ \Delta\rho_{31}^{CB} \ \ldots \ \Delta\rho_{ml}^{CB} \rfloor$$

$$F = \begin{bmatrix} F_{11} & F_{12} \\ 0 & F_{22} \end{bmatrix} \quad F_{12} = \begin{bmatrix} C_b^n & 0_{3\times 3} \\ 0_{3\times 3} & C_b^n \end{bmatrix}$$

$F_{11}$ is coefficient matrix of inertial error state equation.

$$F_{22} = Diag\left[-\frac{1}{T_{rx}} \ -\frac{1}{T_{ry}} \ -\frac{1}{T_{rz}} \ -\frac{1}{T_{ax}} \ -\frac{1}{T_{ay}} \ -\frac{1}{T_{az}}\right]$$

$$H = \begin{bmatrix} 0_{(m-1)\times 3} & 0_{(m-1)\times 3} & H_1 H_2 & 0_{(m-1)\times 3} & 0_{(m-1)\times 3} \\ 0_{(m-1)\times 3} & H_1 C_n^e & 0_{(m-1)\times 3} & 0_{(m-1)\times 3} & 0_{(m-1)\times 3} \\ H_4 C_n^e C_b^n H_3 & 0_{(m-1)\times 3} & 0_{(m-1)\times 3} & 0_{(m-1)\times 3} & 0_{(m-1)\times 3} \end{bmatrix}$$

$$H_1 = \begin{bmatrix} e_{21}^{AB} - e_{11}^{AB} & e_{22}^{AB} - e_{12}^{AB} & e_{23}^{AB} - e_{13}^{AB} \\ e_{31}^{AB} - e_{11}^{AB} & e_{32}^{AB} - e_{12}^{AB} & e_{33}^{AB} - e_{13}^{AB} \\ \vdots & \vdots & \vdots \\ e_{ml}^{AB} - e_{11}^{AB} & e_{m2}^{AB} - e_{12}^{AB} & e_{m3}^{AB} - e_{13}^{AB} \end{bmatrix}$$

where $e_{i1}^{AB}$, $e_{i2}^{AB}$, $e_{i3}^{AB}$ are three elements of direction cosine of the vector from satellite I to antenna A or B in earth center earth frame (ECEF).

$$H_2 = \begin{bmatrix} -(R_n + h)\sin L \cos\lambda & -(R_n + h)\cos L \sin\lambda & \cos L \cos\lambda \\ -(R_n + h)\sin L \cos\lambda & (R_n + h)\cos L \sin\lambda & \cos L \sin\lambda \\ (R_n(1-e)^2 + h)\cos L & 0 & \cos L \end{bmatrix}$$

$$H_3 = \begin{bmatrix} 0 & -r_{CBx}^b & r_{CBy}^b \\ -r_{CBy}^b & r_{CBx}^b & 0 \\ r_{CBx}^b & 0 & -r_{CBx}^b \end{bmatrix}$$

$$H_4 = \begin{bmatrix} e_{21}^{CB} - e_{11}^{CB} & e_{22}^{CB} - e_{12}^{CB} & e_{23}^{CB} - e_{13}^{CB} \\ e_{31}^{CB} - e_{11}^{CB} & e_{32}^{CB} - e_{12}^{CB} & e_{33}^{CB} - e_{13}^{CB} \\ \vdots & \vdots & \vdots \\ e_{ml}^{CB} - e_{11}^{CB} & e_{m2}^{CB} - e_{12}^{CB} & e_{m3}^{CB} - e_{13}^{CB} \end{bmatrix}$$

where $[r_{CBx}^b \ r_{CBy}^b \ r_{CBz}^b]$ is baseline vector (antenna C to B) in body frame.

$$M = \begin{bmatrix} M_1 & 0 & 0 \\ 0 & M_1 & 0 \\ 0 & 0 & M_1 \end{bmatrix}$$

$$M_1 = \begin{bmatrix} -1 & 1 & 0 & \ldots & 0 \\ -1 & 0 & 1 & \ldots & 0 \\ \vdots & \vdots & \vdots & \ddots & \vdots \\ -1 & 0 & 0 & \ldots & 1 \end{bmatrix}$$

$$w = \lfloor w_{gx} \ w_{gy} \ w_{gz} \ w_{ax} \ w_{ay} \ w_{az} \rfloor$$

$$G = \begin{bmatrix} C_b^n & 0_{3\times 3} \\ 0_{6\times 3} & 0_{6\times 3} \\ 0_{3\times 3} & 0_{3\times 3} \\ 0_{3\times 3} & I_{3\times 3} \end{bmatrix}$$

Figure 4:
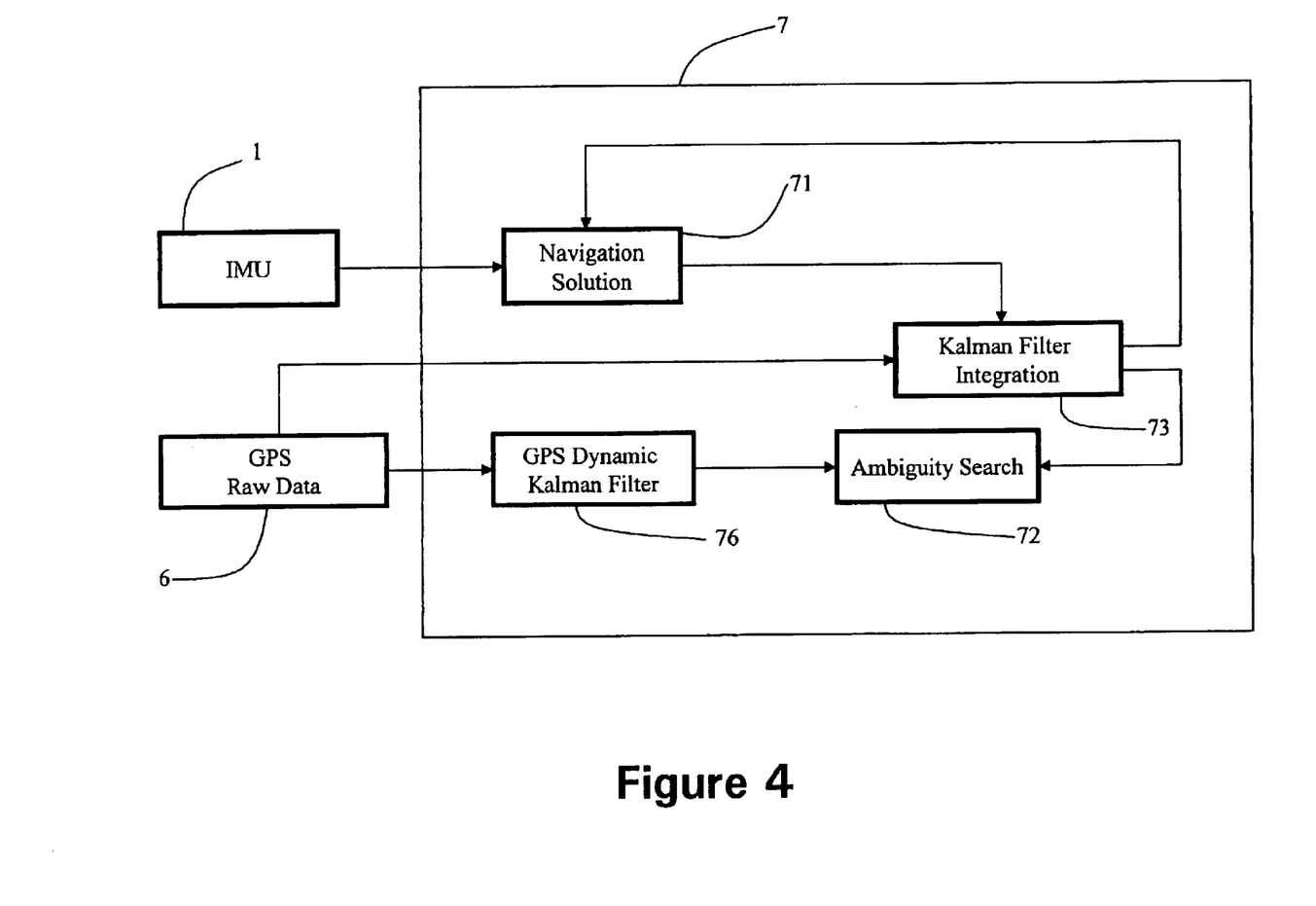
FIG. 4 is a block diagram of a centralized processing module for elevation and azimuth match in the ambiguity search stage according to the present invention.

Referring to FIG. 4, a Centralized Processing module 7 is composed of Navigation Solution module 71, Kalman Filter Integration module 73, Ambiguity Search module 72, and GPS Dynamic Kalman Filter module 76.

In the Kalman Filter Integration module 73, State and measurement equations are in the following.

$$\dot{X} = FX + Gw$$

$$Y = HX + Mv$$

Where, $$X^T = [\phi_N \ \phi_E \ \phi_D \ \delta V_N \ \delta V_E \ \delta V_D \ \delta L \ \delta\lambda \ \delta h \ \varepsilon_{bx} \ \varepsilon_{by} \ \varepsilon_{bz}$$
$$\nabla_x \ \nabla_y \ \nabla_z \ N_{21}^{AB} \ N_{31}^{AB} \ \ldots \ N_{ml}^{AB}]$$

$$Y^T = [\Delta\rho_{21}^{AB} \ \Delta\rho_{31}^{AB} \ \ldots \ \Delta\rho_{ml}^{AB} \ \Delta\dot{\rho}_{21}^{AB} \ \Delta\dot{\rho}_{31}^{CB} \ \ldots \ \Delta\dot{\rho}_{ml}^{AB}]$$

$$F = \begin{bmatrix} F_{11} & F_{12} & 0 \\ 0 & F_{22} & 0 \\ 0 & 0 & 0 \end{bmatrix} \quad F_{12} = \begin{bmatrix} C_b^n & 0_{3\times 3} \\ 0_{3\times 3} & C_b^n \end{bmatrix}$$

$F_{11}$ is coefficient matrix of inertial error state equation.

$$F_{22} = Diag\left[-\frac{1}{T_{rx}} \ -\frac{1}{T_{ry}} \ -\frac{1}{T_{rz}} \ -\frac{1}{T_{ax}} \ -\frac{1}{T_{ay}} \ -\frac{1}{T_{az}}\right]$$

$$H = \begin{bmatrix} 0_{(m-1)\times 3} & 0_{(m-1)\times 3} & H_1 H_2 & 0_{(m-1)\times 3} & 0_{(m-1)\times 3} & \lambda I_{(m-1)\times(m-1)} \\ 0_{(m-1)\times 3} & H_1 C_n^e & 0_{(m-1)\times 3} & 0_{(m-1)\times 3} & 0_{(m-1)\times 3} & 0_{(m-1)\times(m-1)} \end{bmatrix}$$

$$H_1 = \begin{bmatrix} e_{21}^{AB} - e_{11}^{AB} & e_{22}^{AB} - e_{12}^{AB} & e_{23}^{AB} - e_{13}^{AB} \\ e_{31}^{AB} - e_{11}^{AB} & e_{32}^{AB} - e_{12}^{AB} & e_{33}^{AB} - e_{13}^{AB} \\ \vdots & \vdots & \vdots \\ e_{ml}^{AB} - e_{11}^{AB} & e_{m2}^{AB} - e_{12}^{AB} & e_{m3}^{AB} - e_{13}^{AB} \end{bmatrix}$$

where $e_{i1}^{AB}$, $e_{i2}^{AB}$, $e_{i3}^{AB}$ are three elements of direction cosine of the vector from satellite I to antenna A or B in earth center earth frame (ECEF).

$$H_2 = \begin{bmatrix} -(R_n + h)\sin L \cos\lambda & -(R_n + h)\cos L \sin\lambda & \cos L \cos\lambda \\ -(R_n + h)\sin L \cos\lambda & (R_n + h)\cos L \sin\lambda & \cos L \sin\lambda \\ (R_n(1-e)^2 + h)\cos L & 0 & \cos L \end{bmatrix}$$

$$M = \begin{bmatrix} M_1 & 0 & 0 \\ 0 & M_1 & 0 \\ 0 & 0 & M_1 \end{bmatrix}$$

-continued $$M_1 = \begin{bmatrix} -1 & 1 & 0 & \cdots & 0 \\ -1 & 0 & 1 & \cdots & 0 \\ \vdots & \vdots & \vdots & \ddots & \vdots \\ -1 & 0 & 0 & \cdots & 1 \end{bmatrix}$$

$$w = \lfloor w_{gx} \quad w_{gy} \quad w_{gz} \quad w_{ax} \quad w_{ay} \quad w_{az} \rfloor$$

$$G = \begin{bmatrix} C_b^n & 0_{3\times 3} \\ 0_{6\times 3} & 0_{6\times 3} \\ 0_{3\times 3} & 0_{3\times 3} \\ 0_{3\times 3} & I_{3\times 3} \\ 0_{(m-1)\times 3} & 0_{(m-1)\times 3} \end{bmatrix}$$

In the GPS Dynamic Kalman Filter module 76, State and measurement equations are in the following.

$$X_k = FX_{k-1} + \xi_{k-1}$$
$$Y_k = HX_k + \eta_k$$

Where, $X_k^T = \lfloor x \quad y \quad z \quad \dot{x} \quad \dot{y} \quad \dot{z} \quad N_{21}^{CB} \quad N_{31}^{CB} \quad \cdots \quad N_{m1}^{CB} \rfloor$ $$Y_k^T = \lfloor \rho_{21}^{CB} \quad \rho_{31}^{CB} \quad \cdots \quad \rho_{m1}^{CB} \rfloor$$

$$F = \begin{bmatrix} I_{3\times 3} & 0_{3\times 3} & 0_{3\times (m-1)} \\ \Delta T I_{3\times 3} & I_{3\times 3} & 0_{3\times (m-1)} \\ 0_{(m-1)\times 3} & 0_{(m-1)\times 3} & I_{(m-1)\times (m-1)} \end{bmatrix}$$

$$H = \begin{bmatrix} 0_{1\times 3} & & -\lambda & & \\ & 0_{1\times 3} & & -\lambda & \\ H_4 & \cdots & & & \ddots \\ & 0_{1\times 3} & & & -\lambda \end{bmatrix}$$

$$H_4 = \begin{bmatrix} e_{21}^{CB} - e_{11}^{CB} & e_{22}^{CB} - e_{12}^{CB} & e_{23}^{CB} - e_{13}^{CB} \\ e_{31}^{CB} - e_{11}^{CB} & e_{32}^{CB} - e_{12}^{CB} & e_{33}^{CB} - e_{13}^{CB} \\ \vdots & \vdots & \vdots \\ e_{m1}^{CB} - e_{11}^{CB} & e_{m2}^{CB} - e_{12}^{CB} & e_{m3}^{CB} - e_{13}^{CB} \end{bmatrix}$$

[x y z] and $[\dot{x}\ \dot{y}\ \dot{z}]$ are baseline vector and baseline velocity respectively; $\rho_{i1}^{CB}$ is the double difference carrier phase measurements (satellite i to satellite 1, antenna C to B); and $\Delta T$ is sampling period.

Figure 5:
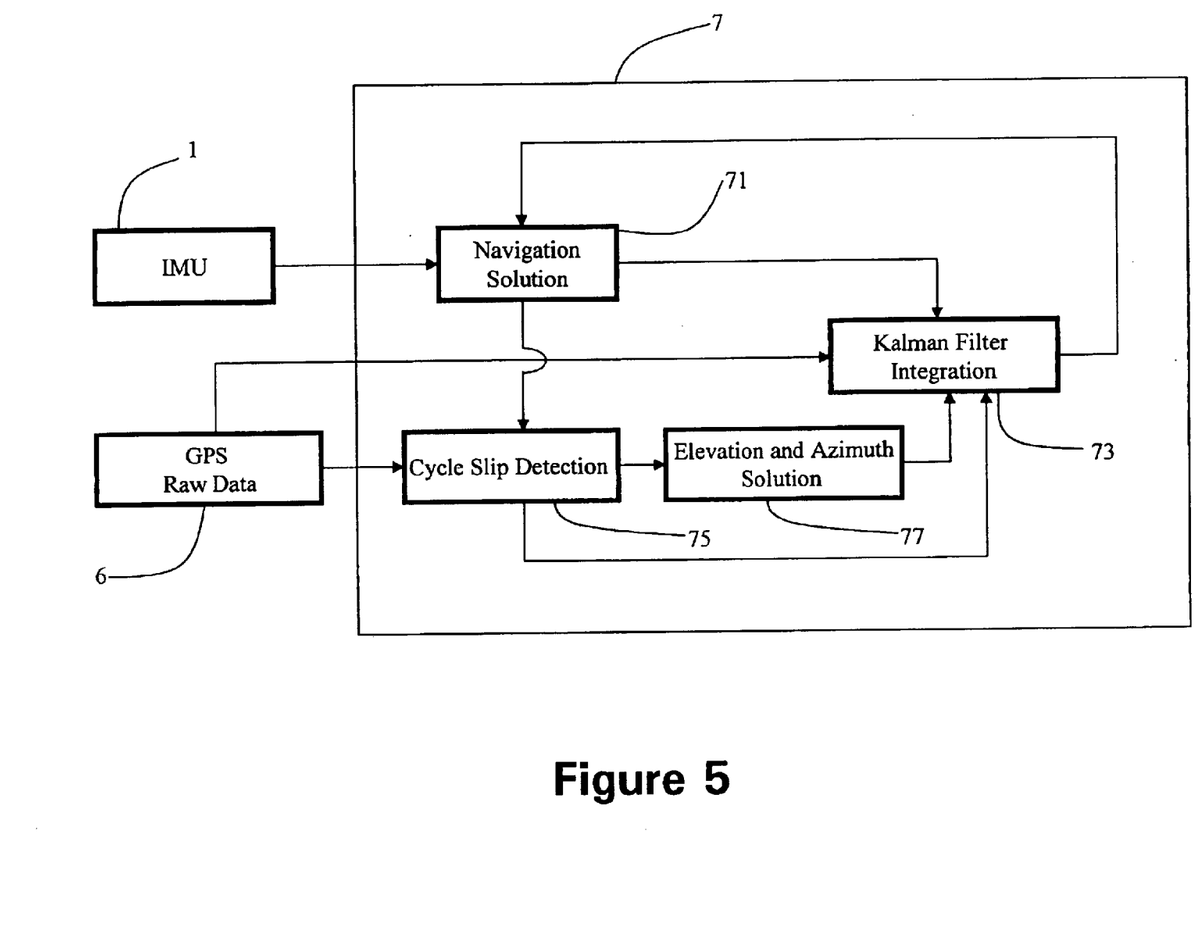
FIG. 5 is a block diagram of a centralized processing module for elevation and azimuth match in the ambiguity fix stage according to the present invention.

Referring to FIG. 5, a Centralized Processing module 7 is composed of Navigation Solution module 71, Kalman Filter Integration module 73, Cycle Slip Detection module 75, and Elevation and Azimuth Solution module 77.

If the ambiguities are fixed all of the estimated ambiguities are known, and are removed from the states. The state equations and measurement equations of Kalman Filter Integration module 73 are in the following:

$$\dot{X} = FX + Gw$$
$$Y = HX + Mv$$

Where, $$X^T = [\phi_N \quad \phi_E \quad \phi_D \quad \delta V_N \quad \delta V_E \quad \delta V_D \quad \delta L \quad \delta \lambda \quad \delta h \quad \varepsilon_{bx} \quad \varepsilon_{by} \quad \varepsilon_{bz}$$
$$\nabla_x \quad \nabla_y \quad \nabla_z \quad N_{21}^{AB} \quad N_{31}^{AB} \quad \cdots \quad N_{m1}^{AB}]$$

$$Y^T = [\Delta \rho_{21}^{AB} \quad \Delta \rho_{31}^{AB} \quad \cdots \quad \Delta \rho_{m1}^{AB} \quad \Delta \dot{\rho}_{21}^{AB} \quad \Delta \dot{\rho}_{31}^{AB} \quad \cdots \quad \Delta \dot{\rho}_{m1}^{AB} \quad \Delta \psi \quad \Delta \theta]$$

$$F = \begin{bmatrix} F_{11} & F_{12} \\ 0 & F_{22} \end{bmatrix} \quad F_{12} = \begin{bmatrix} C_b^n & 0_{3\times 3} \\ 0_{3\times 3} & C_b^n \end{bmatrix}$$

$F_{11}$ is coefficient matrix of inertial error state equation.

$$F_{22} = \mathrm{Diag}\left[ -\frac{1}{T_{rx}} \quad -\frac{1}{T_{ry}} \quad -\frac{1}{T_{rz}} \quad -\frac{1}{T_{ax}} \quad -\frac{1}{T_{ay}} \quad -\frac{1}{T_{az}} \right]$$

$$H = \begin{bmatrix} 0_{(m-1)\times 3} & 0_{(m-1)\times 3} & H_1 H_2 & 0_{(m-1)\times 3} & 0_{(m-1)\times 3} \\ 0_{(m-1)\times 3} & H_1 C_n^e & 0_{(m-1)\times 3} & 0_{(m-1)\times 3} & 0_{(m-1)\times 3} \\ H_5 C_b^n & 0_{2\times 3} & 0_{2\times 3} & 0_{2\times 3} & 0_{2\times 3} \end{bmatrix}$$

$$H_1 = \begin{bmatrix} e_{21}^{AB} - e_{11}^{AB} & e_{22}^{AB} - e_{12}^{AB} & e_{23}^{AB} - e_{13}^{AB} \\ e_{31}^{AB} - e_{11}^{AB} & e_{32}^{AB} - e_{12}^{AB} & e_{33}^{AB} - e_{13}^{AB} \\ \vdots & \vdots & \vdots \\ e_{m1}^{AB} - e_{11}^{AB} & e_{m2}^{AB} - e_{12}^{AB} & e_{m3}^{AB} - e_{13}^{AB} \end{bmatrix}$$

where $e_{i1}^{AB}$, $e_{i2}^{AB}$, $e_{i3}^{AB}$ are three elements of direction cosine of the vector from satellite I to antenna A or B in earth center earth frame (ECEF).

$$H_2 = \begin{bmatrix} -(R_n + h)\sin L \cos \lambda & -(R_n + h)\cos L \sin \lambda & \cos L \cos \lambda \\ -(R_n + h)\sin L \cos \lambda & (R_n + h)\cos L \sin \lambda & \cos L \sin \lambda \\ (R_n(1-e)^2 + h)\cos L & 0 & \cos L \end{bmatrix}$$

$$H_5 = \begin{bmatrix} 0 & \cos \gamma & -\sin \gamma \\ 0 & \dfrac{\sin \gamma}{\cos \theta} & \dfrac{\cos \gamma}{\cos \theta} \end{bmatrix}$$

where $\gamma$, $\theta$ and $\psi$ are roll, pitch and azimuth respectively.

$$M = \begin{bmatrix} M_1 & 0 & 0 \\ 0 & M_1 & 0 \\ 0 & 0 & M_1 \end{bmatrix}$$

$$M_1 = \begin{bmatrix} -1 & 1 & 0 & \cdots & 0 \\ -1 & 0 & 1 & \cdots & 0 \\ \vdots & \vdots & \vdots & \ddots & \vdots \\ -1 & 0 & 0 & \cdots & 1 \end{bmatrix}$$

$$w = \lfloor w_{gx} \quad w_{gy} \quad w_{gz} \quad w_{ax} \quad w_{ay} \quad w_{az} \rfloor$$

$$G = \begin{bmatrix} C_b^n & 0_{3\times 3} \\ 0_{6\times 3} & 0_{6\times 3} \\ 0_{3\times 3} & 0_{3\times 3} \\ 0_{3\times 3} & I_{3\times 3} \end{bmatrix}$$

Referring to FIGS. 1, 2 and 3, a first preferred embodiment of the present invention is illustrated, which comprises the steps as follows:

1) GPS Raw Data module 6 collects the raw data from GPS B 2 and GPS C 4, and sends to the GPS Kalman Filter Integration module 73. The raw data includes pseudorange, Doppler shift, carrier phase and ephemeris.

2) GPS Raw Data module 6 collects the raw data from GPS A 9 by Data Link 8, and sends to the Kalman Filter Integration module 73. The raw data includes pseudorange, Doppler shift, carrier phase and ephemeris.

3) Central Processing module 7 receives IMU data from IMU module 1, and sends to Navigation Solution module 71.

4) Navigation Solution module 71 receives IMU data and performs navigation solution, and outputs the vehicle's attitude, velocity and position to the Kalman Filter Integration module.

5) Kalman Filter Integration module receives the vehicle's attitude, velocity and position from the Navigation Solution module 71 and the GPS raw data from GPS raw data module 6 to construct the coefficient matrices of the Kalman Filter state equations and measurement equations.

6) Kalman Filter Integration module 73 performs Kalman filtering using the state equations and measurement equations to estimate the tilt angle errors, velocity errors, position errors, gyro drifts and accelerometer errors of the Navigation Solution module 71, and sends to Navigation Solution module 71. Kalman Filter Integration module 73 also sends estimated ambiguity floating solution to Ambiguity Solution module 72.

7) Navigation Solution module 71 receives estimated tilt angle errors, velocity errors, position errors, gyro drifts and accelerometer errors, and compensates attitude, velocity, position, gyro measurements and accelerometer measurements while performing navigation solution.

8) Ambiguity Solution module 72 receives estimated ambiguity floating solution and search integer solution. Residual test verifies the integer solution. For the ambiguity of the dual antenna GPS B 2 and GPS C 4 the length of the baseline is used to verify the integer solution.

9) If the ambiguity integer solution is searched to meet the verification criteria the ambiguity is fixed. The state equations and measurement equations of Kalman Filter Integration module are changed. Ambiguity Solution 72 is replaced by Cycle Slip Detection module 75.

10) Cycle Slip Detection module 75 receives GPS raw data from GPS Raw Data module 6 and position data from Navigation Solution module 71, performs cycle slip detection, and sends slip cycle to Kalman Filter Integration module 73.

Referring to FIGS. 1, 4 and 5, a first preferred embodiment of the present invention is illustrated, which comprises the steps as follows:

1) GPS Raw Data module 6 collects the raw data from GPS B 2 and GPS C 4, and sends GPS B 2 raw data to the Kalman Filter Integration module 76. GPS Raw Data module 6 also sends GPS B 2 and GPS C 4 raw data to the GPS Dynamic Kalman Filter module 76. The raw data includes pseudorange, Doppler shift, carrier phase and ephemeris.

2) GPS Raw Data module 6 collects the raw data from GPS A 9 by Data Link 8, and sends to the Kalman Filter Integration module 73. The raw data includes pseudorange, Doppler shift, carrier phase and ephemeris.

3) Central Processing module 7 receives IMU data from IMU module 1, and sends to Navigation Solution module 71.

4) Navigation Solution module 71 receives IMU data and performs navigation solution, and outputs the vehicle's attitude, velocity and position to Kalman Filter Integration module.

5) Kalman Filter Integration module receives the vehicle's attitude, velocity and position from Navigation Solution module 71 and GPS raw data from GPS raw data module 6 to construct the coefficient matrices of the Kalman Filter state equations and measurement equations.

6) Kalman Filter Integration module 73 performs Kalman filtering using the state equations and measurement equations to estimate the tilt angle errors, velocity errors, position errors, gyro drifts and accelerometer errors of the Navigation Solution module 71, and sends to Navigation Solution module 71.

7) Navigation Solution module 71 receives estimated tilt angle errors, velocity errors, position errors, gyro drifts and accelerometer errors, and compensates attitude, velocity, position, gyro measurements and accelerometer measurements while performing navigation solution.

8) GPS Dynamic Kalman Filter 76 receives GPS B 2 and GPS C 4 raw data from GPS Raw Data module 6, and performs Kalman Filter to estimates the baseline vector, baseline velocity and ambiguity.

9) Ambiguity Solution module 72 receives estimated ambiguity floating solution from Kalman Filter Integration module and GPS Dynamic Kalman Filter module 76, and search integer solution. Residual test verifies the integer solution. For the ambiguity of the dual antenna GPS B 2 and GPS C 4 the length of the baseline is used to verify the integer solution.

10) If the ambiguity integer solution is searched to meet the verification criteria the ambiguity is fixed. The state equations and measurement equations of Kalman Filter Integration module are changed. Ambiguity Solution 72 is replaced by Cycle Slip Detection module 75.

11) Cycle Slip Detection module 75 receives GPS raw data from GPS Raw Data module 6 and position data from Navigation Solution module 71, performs cycle slip detection, and sends slip cycle to Kalman Filter Integration module 73 and Elevation and Azimuth Solution module 77.

12) Elevation and Azimuth Solution module 77 calculates the azimuth and elevation, and sends to Kalman Filter Integration module 73.

Kalman Filter Integration module 73 receives GPS raw data from GPS Raw Data module, cycle slip from Cycle Slip Detection module 75, navigation data from Navigation module 71, azimuth and elevation from Elevation and Azimuth module 77, performs Kalman Filter to estimate tilt angle errors, velocity errors, position errors, gyro drifts and accelerometer errors, and sends to Navigation Solution 71 module for compensation.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A high precision positioning and data integrated system, comprising:

an inertial measurement unit (IMU) providing IMU data;

two GPS rovers each providing raw data, wherein said raw data includes pseudorange, Doppler shift, carrier phase and ephemeris;

a centralized processing module which comprises a Kalman Filter Integration module and a Navigation Solution module receiving said IMU data from said IMU unit and outputting an object's attitude, velocity and position to said Kalman Filter Integration module; and a GPS raw data module collecting said raw data from said two GPS rovers and sending to said Kalman Filter Integration module of said centralized processing module, wherein said Kalman Filter Integration module determines tilt angle errors, velocity errors, position errors, gyro drifts and accelerometer errors of said Navigation Solution module.

\* \* \* \* \*